United States Patent [19]

Heinle

[11] Patent Number: 4,688,163
[45] Date of Patent: Aug. 18, 1987

[54] METHOD FOR CONTROLLING THE PHASE ANGLE OF THE OUTPUT CURRENT OR THE OUTPUT VOLTAGE OF A FREQUENCY CONVERTER AND APPARATUS FOR CARRYING OUT THE METHOD

[75] Inventor: Georg Heinle, Erlangen, Fed. Rep. of Germany

[73] Assignee: Siemens Aktiengesellschaft, Berlin and Munich, Fed. Rep. of Germany

[21] Appl. No.: 880,790

[22] Filed: Jul. 1, 1986

[51] Int. Cl.[4] ............................................ H02P 13/20
[52] U.S. Cl. ...................................... 363/96; 363/137
[58] Field of Search ........................ 363/35, 37, 51, 96, 363/136, 137

[56] References Cited

U.S. PATENT DOCUMENTS 4,366,533 12/1982 Kohata et al. ...................... 363/136
4,367,521 1/1983 Kohata et al. ...................... 363/136
4,609,983 9/1986 Braun ..................................... 363/35

FOREIGN PATENT DOCUMENTS 0106006 4/1984 European Pat. Off. .
3131361 2/1983 Fed. Rep. of Germany ........ 363/96
3130672 2/1983 Fed. Rep. of Germany .
3141621 5/1983 Fed. Rep. of Germany ........ 363/37
0708484 1/1980 U.S.S.R. ................................ 363/37

Primary Examiner—Peter S. Wong
Assistant Examiner—Judson H. Jones
Attorney, Agent, or Firm—Kenyon & Kenyon

[57] ABSTRACT

If the output current or the output voltage of a frequency converter is to occupy a respective predetermined phase angle, the output currents or output voltages defining a respective 60° el sector are switched alternatingly with a corresponding pulse/pause ratio. The period of the latter is chosen so that it is a minimum in the center of each 60° el sector and is a maximum at the edge of each sector. Thereby, minimum pulse times are kept also at the edge of the sectors without excessive decrease of the average frequency for the pulsing.

8 Claims, 2 Drawing Figures

4,688,163

METHOD FOR CONTROLLING THE PHASE ANGLE OF THE OUTPUT CURRENT OR THE OUTPUT VOLTAGE OF A FREQUENCY CONVERTER AND APPARATUS FOR CARRYING OUT THE METHOD

BACKGROUND OF THE INVENTION

The present invention relates to a method for controlling the phase angle of the output current of a frequency converter having an intermediate d-c current link, wherein an inverter section of the frequency converter comprises six electronic switches arranged in a three-phase bridge circuit which can be addressed in pairs in six possible switching combinations, with which a primary phase angle corresponding to a natural multiple of 60° el is associated, wherein each reference value for the phase angle of the output current is fed to a drive unit for the inverter, which detects the two primary phase angles immediately adjacent to the phase angle of the output current and which switches back and forth the switching combination associated with the latter alternatingly in such a manner that the phase angle of the output current agrees with the predetermined reference value.

The invention also relates to a method for controlling the phase angle of the output voltage of a frequency converter having an intermediate d-c voltage link, wherein an inverter section of the frequency converter comprises six electronic switches arranged in a three-phase bridge circuit which can be addressed in groups of three in six possible switching combinations, with which a respective primary phase angle is associated in a natural multiple of 60° el and by which at least one further switching combination can be released to which a voltage-less state corresponds, where every reference value for the phase angle of the output voltage is fed to a drive unit for the inverter, which detects the two primary phase angles immediately adjacent to the phase angle of the output voltage and switches back and forth alternatingly the switching combinations associated with them in such a manner that the phase angle of the output voltage agrees with the predetermined reference value.

From DE-OS No. 31 30 672, a method of the type mentioned at the outset is known. There, the period of the alternating cycle is either kept constant (free-running operation) or is chosen so that the period represents a natural fraction of the period of the frequency converter frequency (synchronous pulsing). For the switching of the alternating clock frequency which takes place in a pulse/pause ratio depending on the phase angle, minimum pulse times must be adhered to due to the finite commutation times of the electronic switches in the output section. If the minimum pulse times are not adhered to, the corresponding pulses must be suppressed, which leads to deviations from the desired current or voltage waveform.

SUMMARY OF THE INVENTION

It is therefore an object of the present invention to develop a method of the type mentioned above such that the minimum pulse times are adhered to also for a small pulse/pause ratio, so that the operation of machines connected to the frequency converter is improved.

The above and other objects of the present invention are achieved by a method for controlling the phase angle of the output current of a frequency converter having an intermediate d-c current link, wherein an inverter section of the frequency converter comprises six electronic switches which are arranged in a three phase bridge circuit and can be addressed in pairs in six possible switching combinations, with which a primary phase angle corresponding to a natural multiple of 60° el is respectively associated, where each reference value for the phase angle of the output current is fed to a drive unit for the inverter which detects the two primary phase angles immediately adjacent to the phase angle of the output current, and switches the switching combinations associated with the latter alternatingly in such a manner that the phase angle of the output current agrees with the given reference value, the period of the a-c clock frequency being controlled by the desired value for the phase angle such that the period of the output current located in the middle between two primary phase angles has a minimum value and the period of the output current corresponding with its phase angle to a primary phase angle has a maximum value.

Furthermore, the objects of the invention are achieved for frequency converters having an intermediate d-c voltage link by the provision that the period of the alternating clock frequency is controlled by the set value for the phase angle such that the period of the output voltage located with its phase angle in the middle between two primary phase angles has a minimum value and the period of the output voltage corresponding with its phase angle to a primary phase angle has a maximum value.

One advantageous embodiment of the invention is characterized by the feature that the period changes linearly with the phase angle from the minimum value to the respective immediately adjacent maximum value. Thereby, a simple relationship is obtained between the phase angle and the period, which can easily be realized circuit-wise.

Apparatus for carrying out the method according to the invention is characterized by the features that a first control voltage linearly proportional to the position of the phase angle between two immediately adjacent primary phase angles can be fed to the first input of a comparator for a larger/smaller comparison; that as the second control voltage, an alternating voltage can be fed to the second input of the comparator, the frequency of which can be modulated in triangle-fashion according to the position of the phase angle; and that, corresponding to the comparison result, the alternating clock frequency for switching the primary phase angles adjacent to the phase angle of the output current or the output voltage can be released. Thereby, a definitely simple circuit arrangement is obtained. One advantageous embodiment of the above-mentioned apparatus is designed so that the frequency excursion of the second control voltage can be increased with decreasing frequency-converter frequency. As a result, alternate keying can be performed still frequently enough within a 60° el sector also at a low frequency-converter frequency to simulate the desired reference value well by keying.

BRIEF DESCRIPTION OF THE DRAWINGS

An embodiment of the invention is shown in the drawings and will be explained in greater detail in the following, wherein.

DETAILED DESCRIPTION

Figure 1:
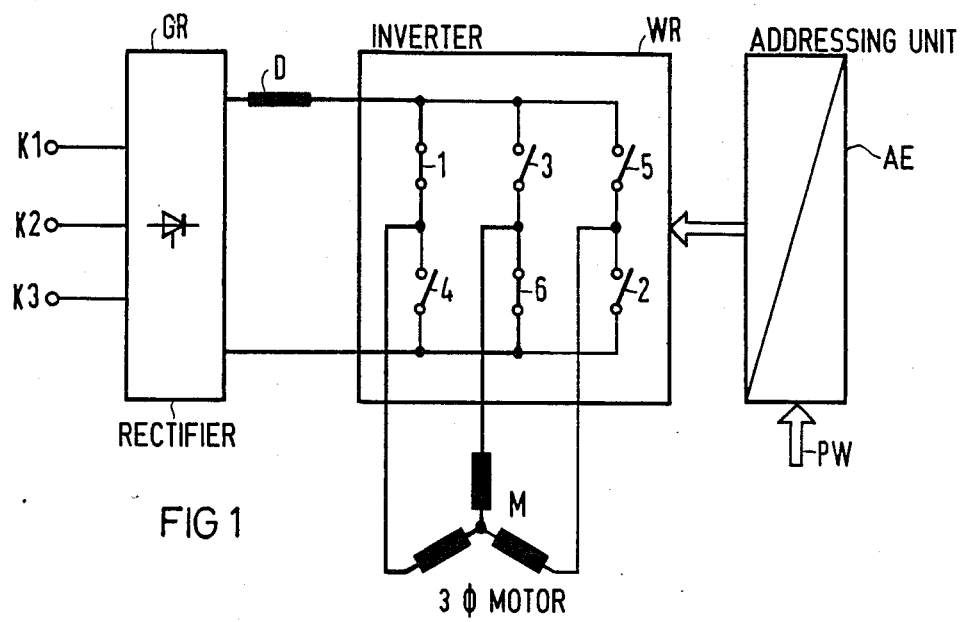
FIG. 1 shows the block diagram of the frequency converter having an intermediate d-c current link.

In the presentation according to FIG. 1, a rectifier GR is shown which is supplied from a three-phase network voltage via terminals K1, K2 and K3. The d-c current supplied by the rectifier GR is fed to an inverter WR via a choke D as the intermediate-link d-c current. This inverter comprises, in principle, 6 electronic switches 1 to 6, arranged in a three-phase bridge circuit.

By means of the switches 1 to 6 which are actuated in pairs, six possible switching combinations can be realized which serve for controlling a three-phase motor M with an output current of predetermined phase angle. Natural multiples of 60° el are obtained by setting one of the six possible switch combinations. In the embodiment shown, the switches 1 and 6, for instance, are shown closed, so that the current is conducted through these switches for the instant in time shown.

Figure 2:
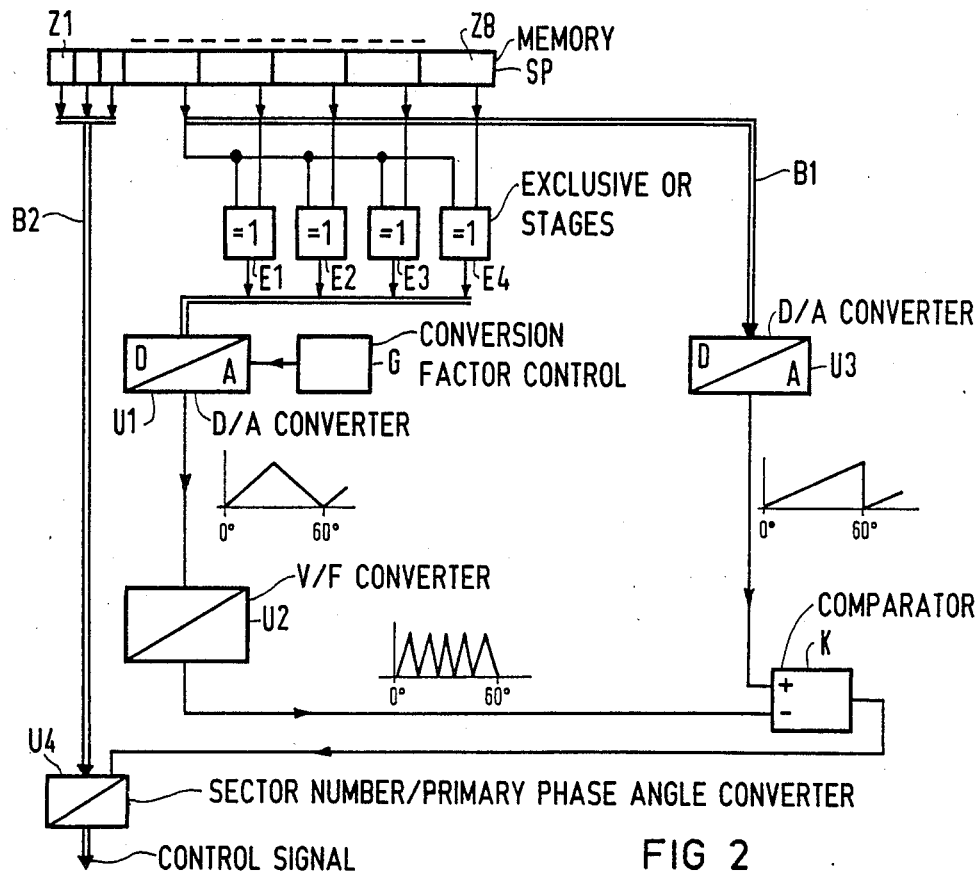
FIG. 2 shows a drive unit for the frequency converter of FIG. 1.

If phase angles of the output are to be realized which deviate from these primary phase angles, this is accomplished by setting alternatingly adjacent primary phase angles and thereby bringing about a switching back and forth according to the pulse/pause ratios corresponding to the phase angle to be set. Addressing the switches 1 to 6 is accomplished by an addressing unit AE to which is fed on the input side a respective reference value for the phase angle of the output current of the frequency changer. A possible basic embodiment of the addressing unit AE is shown in the presentation according to FIG. 2.

The reference value for the phase angle is stored in a memory SP in digital form. This memory SP is divided into individual cells Z1 to Z8, of which the cells Z1 to Z3 contain a characteristic number for the respective sector between the possible primary phase angles, and the cells Z4 to Z8 indicate the respective angle between the primary phase angles. In the embodiment, the angle between two primary phase angles could be divided into 32 binary steps which are traversed cyclically from a sector to sector.

The contents of the storage cells Z4 to Z8 arrives via a bus system B1 at a first digital-analog converter U3 which generates a sawtooth-shaped analog signal for always 60° el as it samples the binary number space uniformly as is indicated in the diagram below the converter U3. This analog signal arrives as the first control voltage at the noninverting input of a comparator K provided as a larger/smaller comparator.

Furthermore, the content of the storage cells Z5 to Z8 is fed respectively to a first input of exclusive-OR stages E1 to E4, of which the respective second input is connected to the memory cell Z4. By this logical interlinkage, a binary number sequence (0000 to 1111 to 0000) ascending from the binary number 00000 to the binary number 01111 stored in the memory cells Z4 to Z8 and descending from the binary number 10000 to the binary number 11111 is generated by the outputs of the exclusive-OR stages E1 to E4 at the input to digital-analog converter U1.

The converter U1 generates a voltage signal proportional to the respectively fed-in binary number, where the conversion factor is fixed by means of the transmitter G such that the resulting output voltage is increased with decreasing frequency-converter frequency.

The output signal of the converter U1 (indicated in a diagram immediately below the converter) is supplied to a converter U2 which is designed as a voltage/frequency converter. The converter U2 generates an a-c voltage signal as the second control voltage which is fed to the inverting input of the comparator K. This second control voltage is indicated in a diagram below the converter U2. The frequency excursion of the second control voltage is determined by the amplitude of the output signal of the converter U1.

The sector number of the respective predetermined phase angle arrives at a converter U4 from the memory SP via a bus system B2. In this converter U4 it is determined by means of the sector number, which two adjacent primary phase angles are to be related to this sector number. These primary phase angles are clocked as a function of the output signal of the comparator K. A corresponding control signal is then fed from the converter U4 to the inverter according to FIG. 1 in order to actuate the switches 1 to 6.

If synchronous pulsing is desired, the number of pulsings per sector should be brought into a relationship with the transit time for a sector. The resulting average pulse frequency could then be synchronized with the frequency-converter frequency. It is also possible to combine the circuit with an additional sine modulation, in accordance with DE-OS No. 31 30 672.

If a frequency converter with an intermediate voltage link is used as the converter, the amplitude of the output voltage can be influenced relatively easily by keying-in the voltage-less state.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method for controlling the phase angle of the output current of a frequency converter having an intermediate d-c current link, wherein an inverter section of the frequency converter comprises six electronic switches which are arranged in a three-phase bridge circuit and which can be addressed in pairs in six possible switching combinations, a primary phase angle corresponding to a natural multiple of 60° el being respectively associated with each switching combination, a reference value for the phase angle of the output current being fed to a drive unit for the inverter which detects the two primary phase angles immediately adjacent to the phase angle of the output current, and switches the switching combinations associated with an alternating clock pulse back and forth, alternatingly such that the phase angle of the output current agrees with the given reference value, said method comprising the step of controlling the period of an a-c clock frequency associated with the inverter section by the reference value for the phase angle such that the period of the output current located in the middle between two primary phase angles has a minimum value and the period of the output current corresponding with its phase angle to a primary phase angle has a maximum value.

2. A method for controlling the phase angle of the output voltage of a frequency converter having an intermediate d-c voltage link, wherein an inverter section of the frequency converter comprises six electronic switches which are arranged in a three-phase bridge circuit and which can be addressed in groups of three in six possible switching combinations, a respective primary phase angle corresponding to a natural multiple of 60° el being associated with each switching combination, and by which at least one further switching combination can be provided to which a voltage-less state corresponds, a reference value for the phase angle of the output voltage being fed to a drive unit for the inverter section which detects the two primary phase angles directly adjacent to the phase angle of the output voltage and switches the switching combinations associated with a alternating clock pulse back and forth alternatingly such that the phase angle of the output voltage agrees with the predetermined reference value, the method comprising the step of controlling the period of a clock frequency associated with the inverter section by the reference values for the phase angle such that the period of the output voltage located with its phase angle in the middle between two primary phase angles has a minimum value, and the period of the output voltage corresponding with its phase angle to a primary phase angle has a maximum value.

3. The method recited in claim 1, wherein the period changes linearly with the phase angle from the minimum value to the respective immediately adjacent maximum value.

4. The method recited in claim 2, wherein the period changes linearly with the phase angle from the minimum value to the respective immediately adjacent maximum value.

5. Apparatus for controlling the phase angle of the output current of a frequency converter having an intermediate d-c current link, wherein an inverter section of the frequency converter comprises six electronic switches which are arranged in a three-phase bridge circuit and which can be addressed in pairs in six possible switching combinations, a primary phase angle corresponding to a natural multiple of 60° el being respectively associated with each switching combination, a reference value for the phase angle of the output current being fed to a drive unit for the inverter which detects the two primary phase angles immediately adjacent to the phase angle of the output current, and switches the switching combinations associated with the alternating clock pulse back and forth alternatingly such that the phase angle of the output current agrees with the given reference value, said apparatus further comprising means for controlling the period of an a-c clock frequency associated with the inverter section by the reference value for the phase angle such that the period of the reference output current located in the middle between two primary phase angles has a minimum value and the period of the output current corresponding with its phase angle to a primary phase angle has a maximum value; said means comprising comparator means having a first input to which is coupled a first control voltage which is linearly proportional to the position of the phase angle between two immediately adjacent primary phase angles and a second input to which is coupled a second control voltage comprising an a-c voltage, the frequency of the second control voltage being modulated in triangle shape according to the position of the phase angle; said a-c clock frequency for switching the primary phase angles adjacent to the phase angle of the output current being released by a control signal from the comparator means according to the result of the comparison.

6. The apparatus recited in claim 5, wherein a frequency excursion of the second control voltage can be increased with decreasing frequency converter frequency.

7. Apparatus for controlling the phase angle of the output voltage of a frequency converter having an intermediate d-c voltage link, wherein an inverter section of the frequency converter comprises six electronic switches which are arranged in a three-phase bridge circuit and which can be addressed in groups of three in six possible switching combinations, a respective primary phase angle corresponding to a natural multiple of 60° el being associated with each switching combination, and by which at least one further switching combination can be provided to which a voltage-less state corresponds, a reference value for the phase angle of the output voltage being fed to a drive unit for the inverter section which detects the two primary phase angles directly adjacent to the phase angle of the output voltage and switches the switching combinations associated with the alternating clock pulse back and forth alternatingly such that the phase angle of the output voltage agrees with the predetermined reference value, said apparatus further comprising means for controlling the period of an a-c clock frequency associated with the inverter section by the reference value for the phase angle such that the period of the output voltage located with its phase angle in the middle between two primary phase angles has a minimum value, and the period of an output voltage corresponding with its phase angle to a primary phase angle has a maximum value; said means comprising comparator means having a first input to which is coupled a first control voltage which is linearly proportional to the position of the phase angle between two immediately adjacent primary phase angles and a second input to which is coupled a second control voltage comprising an a-c voltage, the frequency of said second control voltage being modulated in triangle shape according to the position of the phase angle; said a-c clock frequency for switching the primary phase angles adjacent to the phase angle of the output voltage being released by control signals of the comparator according to the result of the comparison.

8. The apparatus recited in claim 7, wherein the frequency excursion of the second control voltage can be increased with decreasing frequency converter frequency.

* * * * *